United States Patent
Jaradi et al.

(10) Patent No.: US 10,272,868 B2
(45) Date of Patent: Apr. 30, 2019

(54) ROOF MOUNTED AIRBAG ASSEMBLY FOR REAR SEAT

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 150 days.

(21) Appl. No.: 15/429,933

(22) Filed: Feb. 10, 2017

(65) Prior Publication Data

US 2018/0229681 A1    Aug. 16, 2018

(51) Int. Cl.
| | |
|---|---|
| *B60R 21/214* | (2011.01) |
| *B60R 21/2165* | (2011.01) |
| *B60R 21/232* | (2011.01) |
| *B60R 21/237* | (2006.01) |
| *B60R 21/262* | (2011.01) |
| *B60R 21/264* | (2006.01) |

(Continued)

(52) U.S. Cl.
CPC ........ *B60R 21/214* (2013.01); *B60R 21/2165* (2013.01); *B60R 21/232* (2013.01); *B60R 21/237* (2013.01); *B60R 21/262* (2013.01); *B60R 21/264* (2013.01); *B60R 21/263* (2013.01); *B60R 2021/0004* (2013.01);

(Continued)

(58) Field of Classification Search
CPC ........ B60R 21/214; B60R 2021/23161; B60R 2021/23153
See application file for complete search history.

(56) References Cited

U.S. PATENT DOCUMENTS

| | | | |
|---|---|---|---|
| 8,393,637 B2 | 3/2013 | Choi et al. | |
| 8,596,673 B2 * | 12/2013 | Ruedisueli | B60R 21/21 280/730.2 |

(Continued)

FOREIGN PATENT DOCUMENTS

| | | |
|---|---|---|
| DE | 10321840 A1 | 12/2004 |
| DE | 102014013649 A1 | 3/2016 |

(Continued)

OTHER PUBLICATIONS

"Roof airbag helps produce a more relaxed interior", Safety.TRW. com, posted Apr. 10, 2014.
GB Search Report dated Jul. 27, 2018 re GB Appl. No. 1801935.6.

*Primary Examiner* — James A English
(74) *Attorney, Agent, or Firm* — Frank A. MacKenzie; Bejin Bieneman PLC

(57) ABSTRACT

An airbag assembly includes a base member and an airbag supported by the base member and being inflatable to an inflated position. The airbag includes a panel and a plurality of sheets attached to the panel. The panel includes a first portion extending in a first direction from the base member to a distal end and a second portion extending in a second direction transverse to the first direction from the base member to a distal end. Each sheet is elongated in the first direction along the first portion of the panel and elongated in the second direction along the second portion of the panel. During a vehicle impact, the momentum of the occupant may move the occupant towards the airbag. The airbag may absorb energy from the head and knees of the occupant, which may assist in reducing injuries.

20 Claims, 7 Drawing Sheets

(51) Int. Cl.
    *B60R 21/263*     (2011.01)
    *B60R 21/00*      (2006.01)
    *B60R 21/16*      (2006.01)
    *B60R 21/231*     (2011.01)
    *B60R 21/2338*    (2011.01)

(52) U.S. Cl.
    CPC ........... *B60R 2021/0006* (2013.01); *B60R 2021/0009* (2013.01); *B60R 2021/0023* (2013.01); *B60R 2021/0048* (2013.01); *B60R 2021/0051* (2013.01); *B60R 2021/161* (2013.01); *B60R 2021/23153* (2013.01); *B60R 2021/23161* (2013.01); *B60R 2021/23169* (2013.01); *B60R 2021/23382* (2013.01); *B60R 2021/23388* (2013.01)

(56) References Cited

U.S. PATENT DOCUMENTS

| | | |
|---|---|---|
| 8,602,448 B2 | 12/2013 | Choi et al. |
| 9,016,717 B1 | 4/2015 | Clauser et al. |
| 9,321,423 B2 | 4/2016 | Jaradi et al. |
| 9,446,733 B2 | 9/2016 | Pausch et al. |
| 9,676,361 B2* | 6/2017 | Smith .................. B60R 21/232 |
| 2005/0206138 A1* | 9/2005 | Breuninger ........... B60R 21/231 280/729 |
| 2006/0163848 A1 | 7/2006 | Abe |
| 2012/0133114 A1 | 5/2012 | Choi et al. |
| 2015/0203066 A1* | 7/2015 | Pausch .................. B60R 21/231 280/730.1 |
| 2018/0215338 A1* | 8/2018 | Faruque ............. B60R 21/0136 |
| 2018/0319358 A1* | 11/2018 | Schneider ............ B60R 21/233 |

FOREIGN PATENT DOCUMENTS

| | | |
|---|---|---|
| GB | 2364674 B | 9/2003 |
| JP | 2010254188 A | 11/2010 |
| KR | 1020120124079 A | 11/2012 |
| WO | 2004050435 A1 | 6/2004 |
| WO | 2012144748 A2 | 10/2012 |

\* cited by examiner

ROOF MOUNTED AIRBAG ASSEMBLY FOR REAR SEAT

BACKGROUND

During a vehicle impact, occupants may move in a direction influenced by the momentum of the vehicle. In a frontal vehicle impact, an occupant may contact a seatback of a row of seating in front of the occupant. During the impact, the vehicle decelerates before the occupant decelerates. When the vehicle has decelerated but the occupant still has forward momentum, the occupant leans forward and may slide forward. This motion may bring the head or knees of the occupant in contact with the seatback in front of the occupant.

Some vehicle impacts, e.g., front impact, side impact, frontal offset impacts, far side oblique impact, near side oblique impact, etc., may cause the occupants to move at an angle towards vehicle components, e.g., toward a hinge pillar, a door, etc., or another occupant. In this situation, the momentum of the occupant may urge the head of the occupant to slide and/or rotate across a face of an inflated airbag.

DETAILED DESCRIPTION

Figure 3:
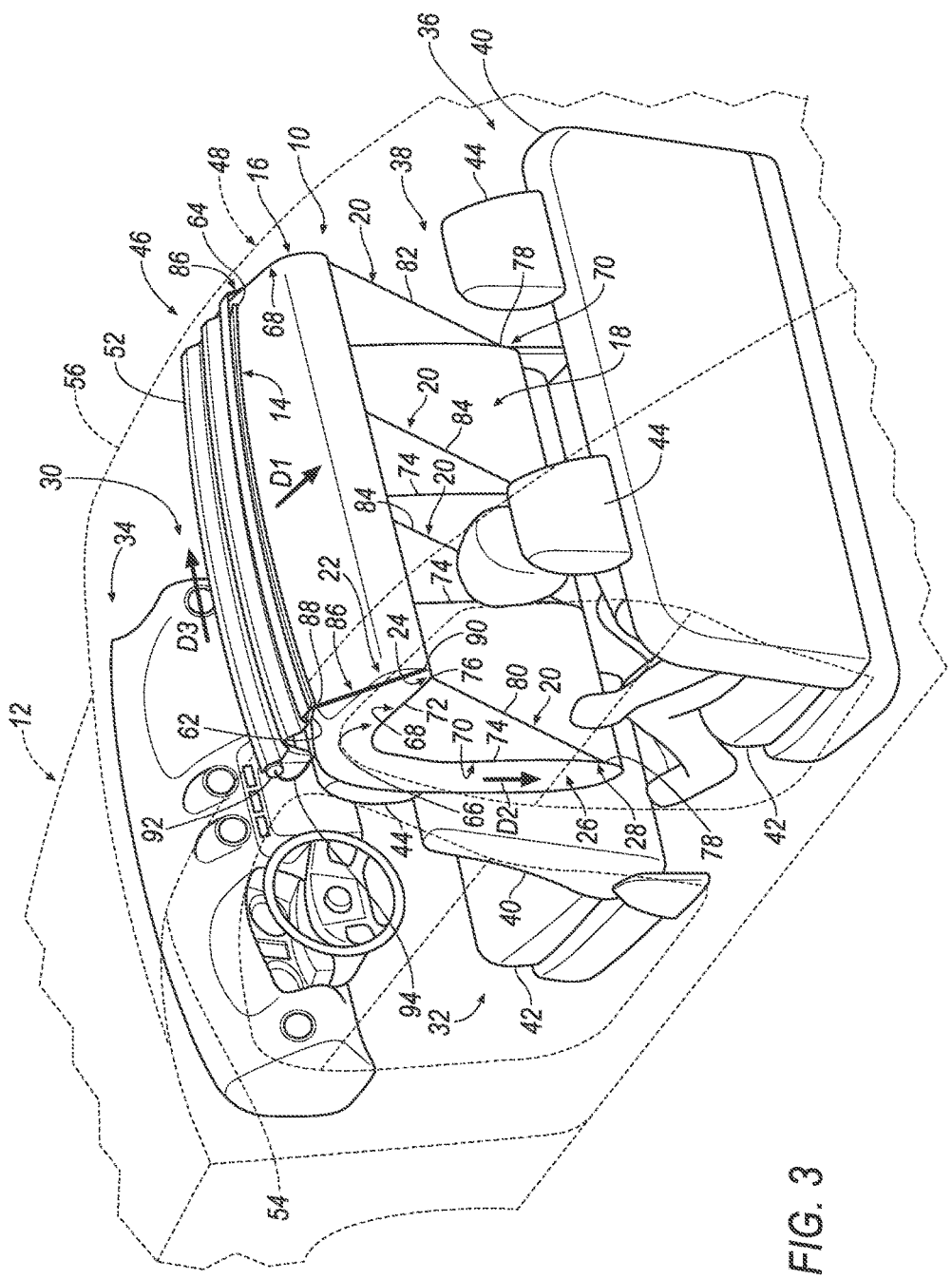
FIG. 3 is a perspective view of the vehicle with the airbag assembly in an inflated position.
Figure 4:
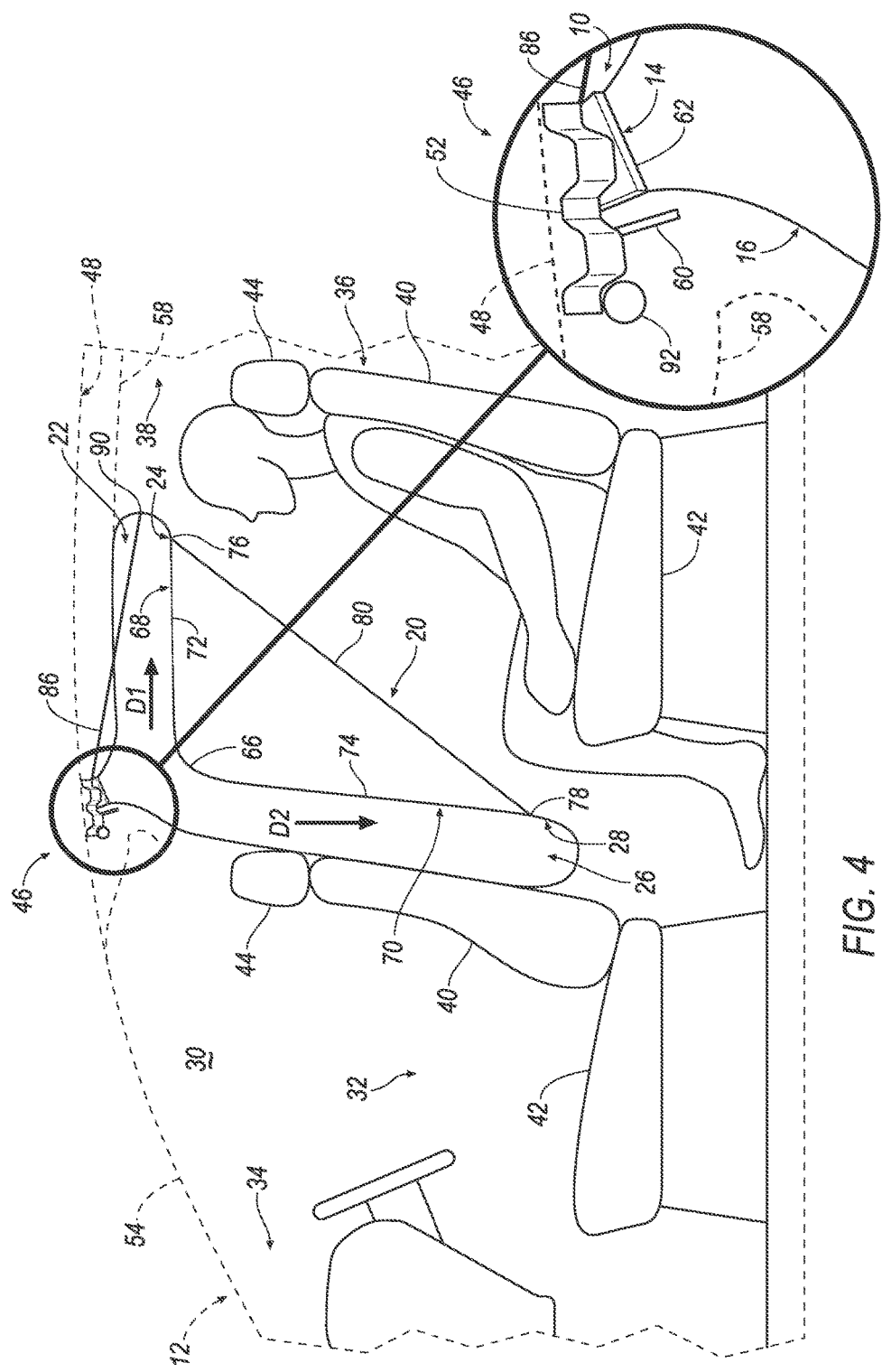
FIG. 4 is a side view of the vehicle with airbag assembly in the inflated position.

With reference to the Figures, wherein like numerals indicate like parts throughout the several views, an airbag assembly 10 for a vehicle 12 includes a base member 14 and an airbag 16 supported by the base member 14. The airbag assembly 10, specifically the airbag 16, is inflatable to an inflated position, as shown in FIGS. 3, 4, and 5B. The airbag 16 includes a panel 18 and a plurality of sheets 20 attached to the panel 18. The panel 18, in the inflated position, includes a first portion 22 extending in a first direction D1 from the base member 14 to a distal end 24 of the first portion 22, and a second portion 26 extending in a second direction D2 transverse to the first direction D1 from the base member 14 to a distal end 28 of the second portion 26. Each sheet 20 is elongated in the first direction D1 along the first portion 22 of the panel 18 and is elongated in the second direction D2 along the second portion 26 of the panel 18.

Figure 1:
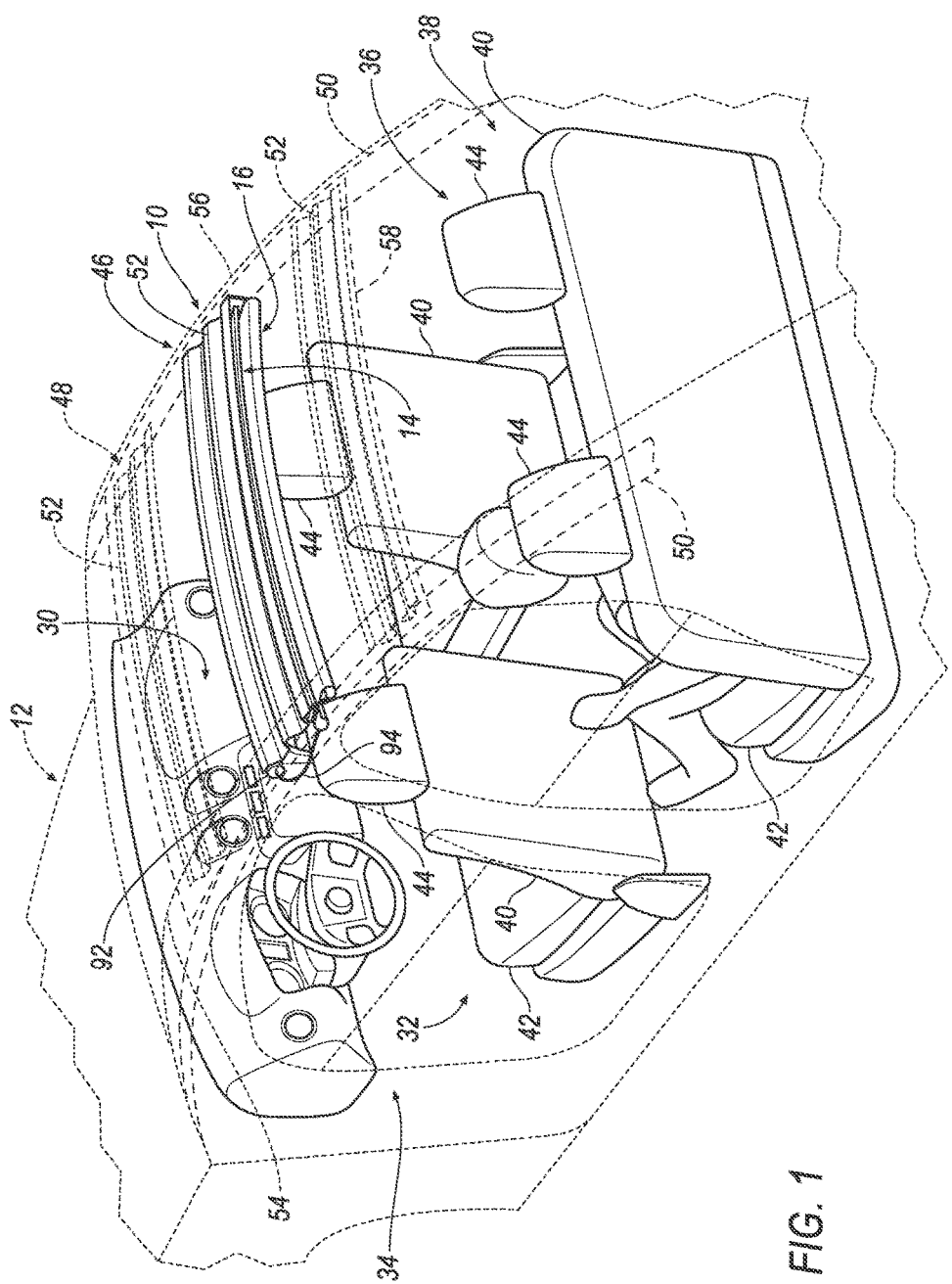
FIG. 1 is a perspective view of a vehicle with an airbag assembly in an uninflated position.
Figure 2:
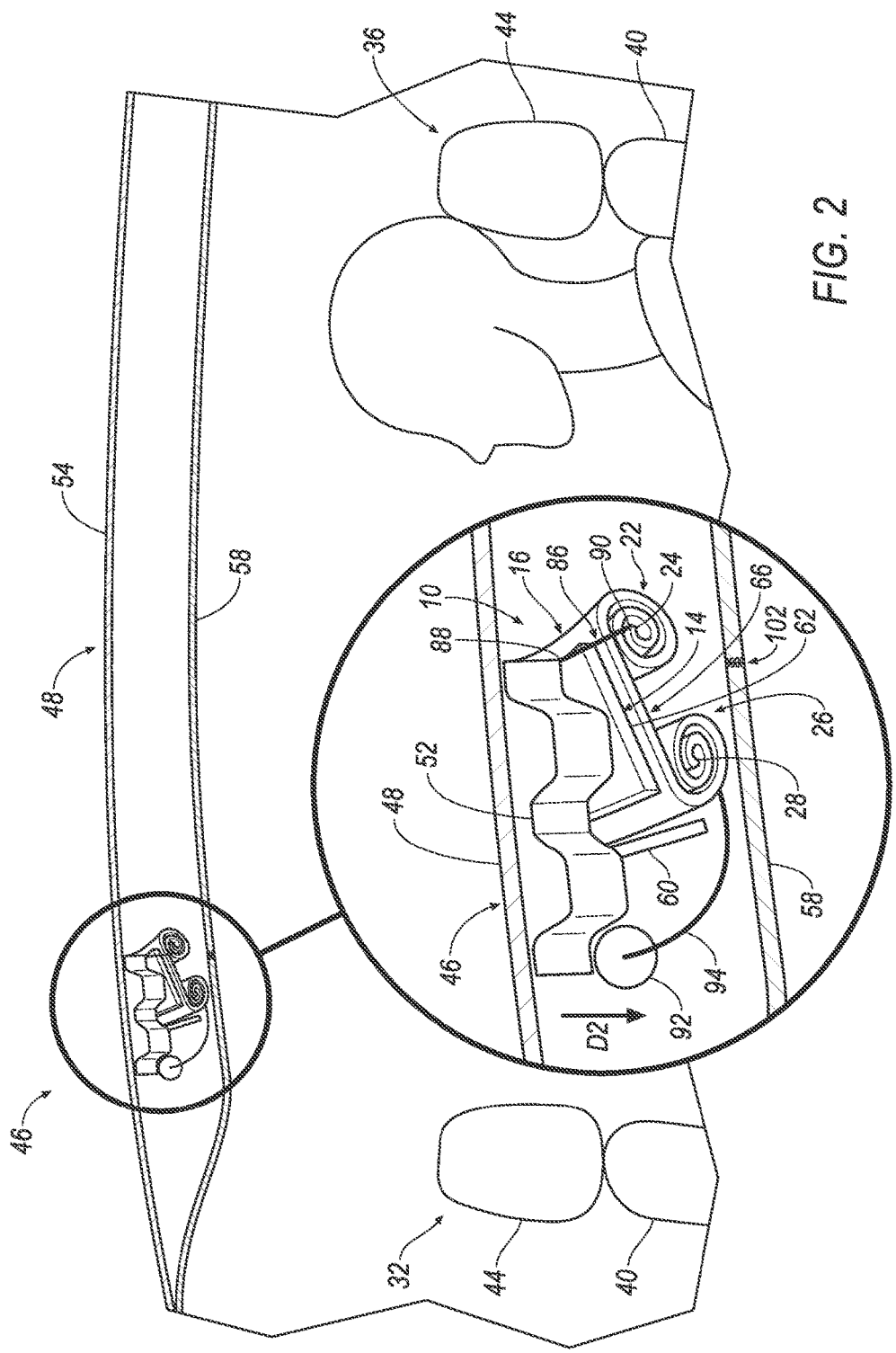
FIG. 2 is a side view of the vehicle with the airbag assembly in the uninflated position.
Figure 5A:
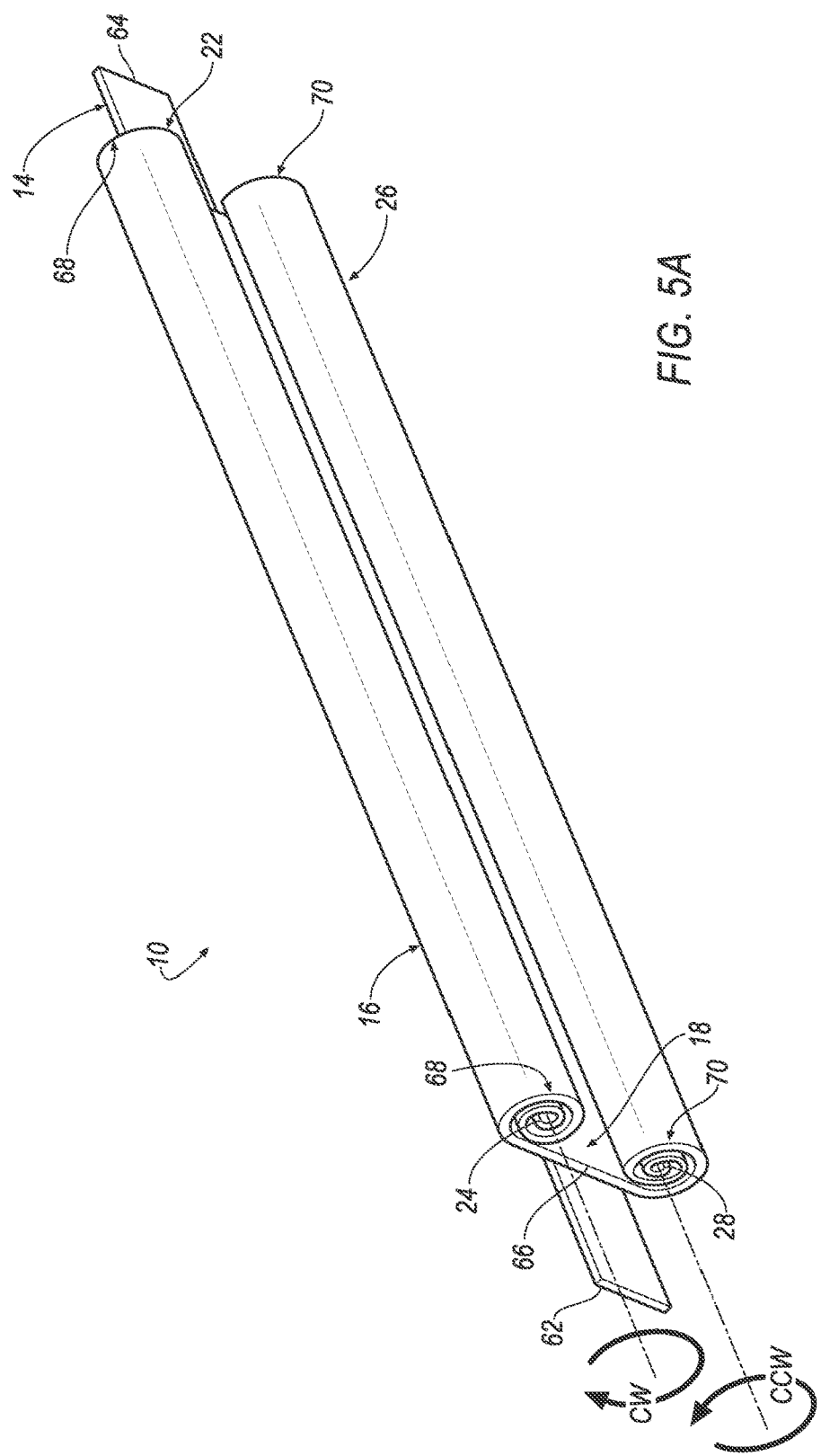
FIG. 5A is a perspective view of the airbag assembly in the uninflated position including a base member and an airbag supported by the base member.
Figure 5B:
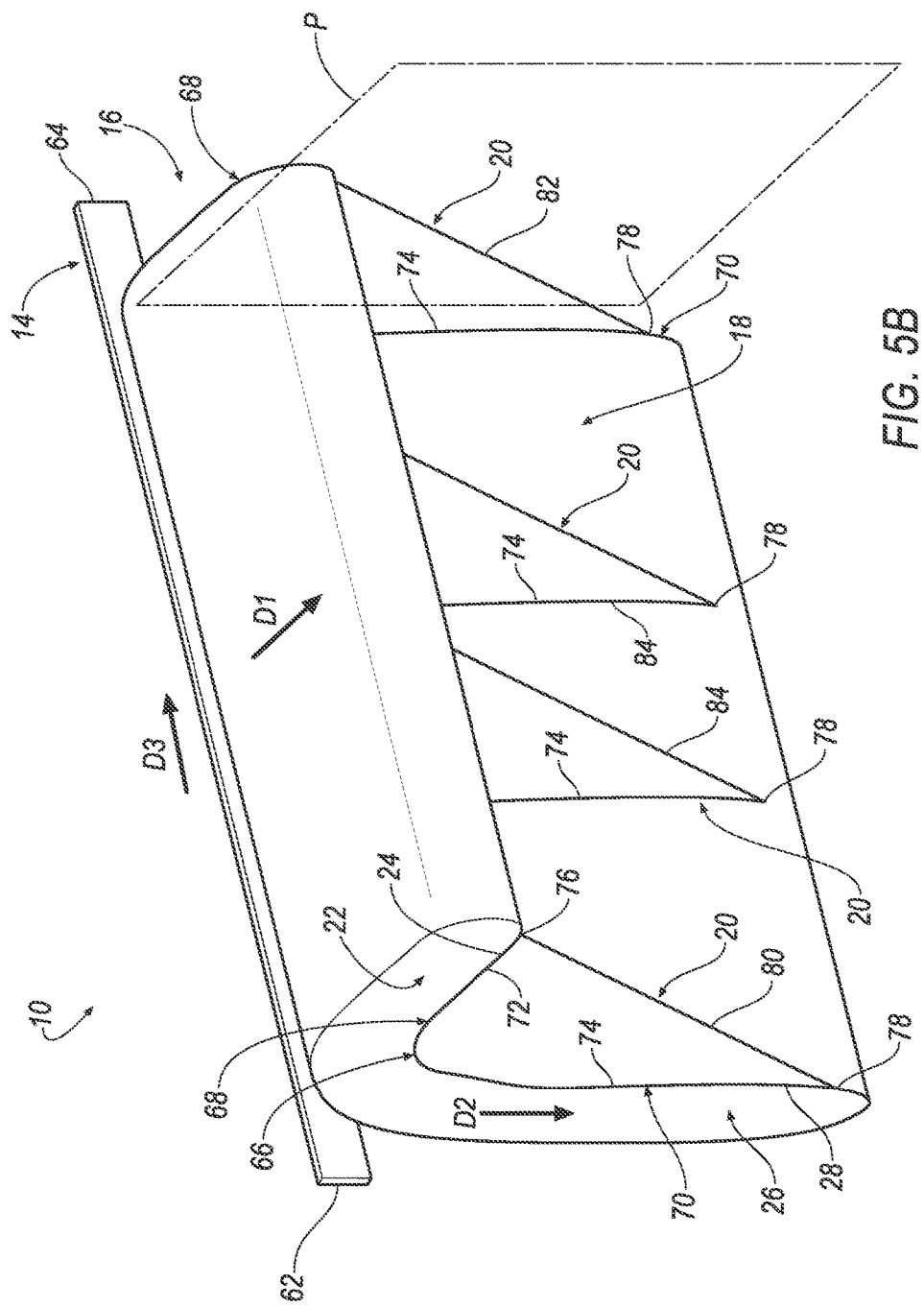
FIG. 5B is a perspective view of the airbag assembly in the inflated position including the base member, the airbag supported by the base member, and a plurality of sheets attached to the airbag.

During a vehicle impact, the airbag 16 may be inflatable from an uninflated position, as shown in FIGS. 1, 2 and 5A, to the inflated position, as shown in FIGS. 3, 4, and 5B. During the vehicle impact, the occupant may be forced into the panel 18 and/or one of the sheets 20 in the inflated position. During a frontal impact, the panel 18 may provide coverage so as to absorb the energy for the knees and head of the occupant, and reduce the likelihood of injury. Some vehicle impacts, e.g., side impact, frontal offset impacts, far side oblique impact, near side oblique impact, etc., may cause the occupants to move at an angle toward vehicle components, e.g., a B-pillar, hinge pillar, door, etc. During these types of impacts, the panel 18 may slow or stop the head of the occupant and the knees of the occupant from impacting vehicle components. The plurality of sheets 20 may slow or stop the head of the occupant from sliding across the panel 18 to reduce the likelihood of the head of the occupant impacting vehicle components or another occupant. In this situation, as the head of the occupant impacts one of the sheets 20, one of the sheets 20 may absorb the energy from the head of the occupant. In other words, one of the sheets 20 may catch the head of the occupant and retain the head of the occupant on the panel 18. One of the sheets 20 catches the head of the occupant to assist in limiting or preventing sliding of the head across the airbag 16 and/or head rotation after contact with the airbag 16, which may reduce head injury criteria (HIC) and/or brain injury criteria (BrIC). Formulae for HIC and BrIC are standardized by the National Highway Traffic Safety Administration (NHTSA).

The vehicle 12 may, for example, be any suitable type of automobile. As shown in FIG. 1, the vehicle 12 includes a passenger cabin 30 to house occupants, if any, of the vehicle 12. The passenger cabin 30 includes one or more front seats 32 disposed at a front 34 of the passenger cabin 30 and one or more rear seats 36 spaced from the front seats 32. The rear seats 36 may be, for example, disposed behind the front seats 32 in the passenger cabin 30. The passenger cabin 30 may also include third-row seats (not shown) at a rear 38 of the passenger cabin 30, in which case the front seats 32 may be second-row seats (not numbered) instead of or in addition to being front seats 32. The front seats 32 and the rear seats 36 may be a same or different type of seat. The front seats 32 and rear seats 36 may be any suitable type of seats. The front seats 32 may be, for example, a bucket seat and the rear seats 36 may be, for example, a bench seat, as shown in FIGS. 1-4.

With continued reference to FIG. 1, the seats, i.e., the front seats 32 and the rear seats 36, may include a seatback 40, a seat bottom 42, and a head restraint 44. The head restraint 44 may be supported by the seatback 40 and may be stationary or movable relative to the seatback 40. The seatback 40 may be supported by the seat bottom 42 and may extend upwardly from the seat bottom 42. The seatback 40 may be stationary or movable relative to the seat bottom 42. The seatback 40, the seat bottom 42, and/or the head restraint 44 may be adjustable in multiple degrees of freedom. Specifically, the seatback 40, the seat bottom 42, and/or the head restraint 44 may themselves be adjustable, in other words, may have adjustable components within themselves, and/or may be adjustable relative to each other.

The vehicle 12 may include a passenger restraint system 46 having a roof 48 and the airbag assembly 10, which includes the airbag 16. The roof 48 may support the airbag assembly 10, and specifically, may support the airbag 16 when the airbag 16 is in the inflated position. The airbag assembly 10 may be mounted to the roof 48, as set forth below.

With reference to FIG. 1, the roof 48 may include a plurality of roof side rails 50 and a plurality of roof crossbeams 52 supported by the roof side rails 50. The roof 48 may include a first side 54 and a second side 56 spaced from the first side 54. For example, the first side 54 may be adjacent one roof side rail 50, and the second side 56 may be adjacent the other roof side rail 50. The first side 54 may extend along one roof side rail 50 from the front 34 of the passenger cabin 30 to the rear 38 of the passenger cabin 30, and the second side 56 may extend along the other side rail 50 from the front 34 of the passenger cabin 30 to the rear 38 of the passenger cabin 30.

The roof 48 may include a headliner 58, as shown in FIG. 1, supported by the roof cross-beams 52. The headliner 58 may extend from the first side 54 of the roof 48 to the second side 56 of the roof 48. The airbag 16 may be disposed between the roof 48 and the headliner 58 in the uninflated position, as shown in FIG. 2. The headliner 58 may have a tear seam 102 for allowing the airbag 16 to break through the headliner 58 when the airbag 16 is inflated from the uninflated position to the inflated position. The tear seam 102 may be adjacent the airbag 16 in the uninflated position, as shown in FIG. 2.

With continued reference to FIG. 2, the passenger restraint system 46 may include a deflector 60 attached to the roof 48 adjacent the second portion 26 of the panel 18 to deflect the second portion 26 of the panel 18 in the second direction D2, i.e., generally downwardly. The deflector 60 may be disposed between the second portion 26 of the panel 18 and the seatback 40 of the front seat 32. The deflector 60 may extend from the roof 48 along the second direction D2. In other words, the deflector 60 may have a deflecting surface (not numbered) that extends along the second direction D2. The deflecting surface may be parallel to the second direction D2, or the direction of the extension of the deflecting surface may have a component, i.e., a vector, in the second direction D2. The deflector 60 is covered by the headliner 58 when the airbag 16 is in the uninflated position. In other words, the deflector 60 may extend any suitable amount from the roof 48 towards the headliner 58. The deflector 60 may be formed of any suitable type of material such as metal, plastic, etc.

The airbag assembly 10 may include the base member 14 attached to the roof 48, e.g., one roof cross-beam 52, and supporting the airbag 16, as set forth above. The base member 14 may be flat. As another example, the base member 14 may include a cavity (not shown) that may house the airbag 16 in the uninflated position and may support the airbag 16 on the roof 48, e.g., one roof cross-beam 52, in the inflated position. In other words, the base member 14 may be a housing (not numbered). The base member 14 may, for example, include clips, panels, etc. for attaching the airbag 16 and for attaching the airbag assembly 10 to the roof 48, e.g., one roof cross-beam 52.

The base member 14 may include two sides 62, 64 spaced from each other in a direction D3 from the first side 54 of the roof 48 to the second side 56 of the roof 48, i.e., a cross-vehicle direction. The base member 14 may be elongated from one side 62 to the other side 64. For example, one side 62 of the base member 14 may be adjacent to the first side 54 of the roof 48 and the other side 64 of the base member 14 may be adjacent to the second side 56 of the roof 48, as shown in FIGS. 1-4.

The airbag 16 may be formed of any suitable type of material or materials. The airbag 16 may be formed of any suitable airbag material, for example, a woven polymer. For example, the airbag 16 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The panel 18 of the airbag 16 may include a plurality of segments, i.e., two or more, that are separately formed and subsequently attached together, e.g., by stitching, welding, adhering, etc. As another example, the panel 18 of the airbag 16 may be a single continuous unit, e.g., initially woven as a single piece of fabric.

The panel 18 may define an inflation chamber (not shown). During inflation, the inflation chamber may be inflated from the uninflated position to the inflated position, as set forth below. The panel 18 is spaced from the base member 14 in the inflated position. For example, the panel 18 is adjacent the occupant in the inflated position, as shown in FIG. 3. During inflation, the panel 18 may extend in both the first direction D1 and the second direction D2 away from the base member 14.

With reference to FIG. 3, when in the inflated position, the panel 18 faces an intended occupant, e.g., the occupant of the rear seat 36. The panel 18 is positioned to receive and be impacted by the occupant when the airbag assembly 10 is inflated during an impact that urges the occupant toward the airbag assembly 10. In other words, the panel 18 may be referred to as an "impact panel."

The panel 18, i.e., the first portion 22 and the second portion 26, may be disposed between the front seats 32 and the rear seats 36, as shown in FIG. 2. The second portion 26 of the panel 18 may abut the seatback 40 of the front seat 32 in the inflated position, as shown in FIG. 4. When the airbag 16 is in the inflated position, the seatback 40 of the front seat 32 may provide a counteracting force against the second portion 26 of the panel 18 when the second portion 26 of the panel 18 is impacted by the head and/or the knees of the occupant such that second portion 26 of the panel 18 is squeezed between the head and/or the knees of the occupant and the seatback 40 of the front seat 32.

With reference to FIG. 4, in the inflated position, the first portion 22 extends in the first direction D1 and the second portion 26 extends in the second direction D2 transverse to the first portion 22, as set forth above. The first direction D1 may extend along the roof 48 away from the base member 14 towards the rear 38 of the passenger cabin 30, i.e., towards the seatback 40 of the rear seat 36. The second direction D2 may extend transverse to the roof 48 away from the base member 14 towards the seat bottom 42 of the rear seat 36.

With continued reference to FIG. 4, the distal end 24 of the first portion 22 of the panel 18 may be spaced from the base member 14. In the inflated position, the first portion 22 of the panel 18 extends in the first direction D1 from the base member 14 to the distal end 24 of the first portion 22 of the panel 18. The distal end 24 of the first portion 22 of the panel 18 may be adjacent the roof 48, e.g., the headliner 58, in the inflated position. The distal end 24 of the first portion 22 of the panel 18 may be, for example, disposed between the roof 48 and the head of the occupant of the rear seat 36. The first portion 22 of the panel 18 may extend at least partially over the seat bottom 42 of the rear seat 36.

With continued reference to FIG. 4, the distal end 28 of the second portion 26 of the panel 18 may be spaced from the base member 14. In the inflated position, the second portion 26 extends in the second direction D2 from the base member 14 to the distal end 28 of the second portion 26 of the panel 18. The distal end 28 of the second portion 26 of the panel 18 is spaced from the distal end 24 of the first portion 22 of the panel 18, in the inflated position. In other words, the distal end 28 of the second portion 26 of the panel 18 may be spaced from the roof 48 in the inflated position. The distal end 28 of the second portion 26 of the panel 18 may be, for example, disposed adjacent the knees of the occupant in the inflated position, i.e., adjacent the seat bottom 42 of the rear seat 36.

The panel 18 includes an intermediate portion 66 extending from the first portion 22 of the panel 18 to the second portion 26 of the panel 18, as identified in FIG. 5A. During inflation, the first portion 22 of the panel 18 and the second portion 26 of the panel 18 may extend away from the base member 14, and the intermediate portion 66 of the panel 18 may remain adjacent the base member 14, as shown in FIG. 5B. The intermediate portion 66 of the panel 18 may be angular or rounded when transitioning from the first portion 22 of the panel 18 to the second portion 26 of the panel 18. As set forth above, the base member 14 may include means for attaching the airbag 16 to the base member 14. Specifically, the intermediate portion 66 of the panel 18 is attached to the base member 14, as shown in FIGS. 5A and 5B.

The first portion 22 of the panel 18 and the second portion 26 of the panel 18 extend in opposite directions from the intermediate portion 66 of the panel 18 in the uninflated position. The first portion 22 of the panel 18 extends, for example, from the intermediate portion 66 of the panel 18 towards the rear 38 of the passenger cabin 30, i.e., in the first direction D1, as shown in FIG. 2. The second portion 26 of the panel 18 extends, for example, from the intermediate portion 66 of the panel 18 generally towards the front 34 of the passenger cabin 30. For example, the second portion 26 of the panel 18 may extend obliquely from the base member 14 towards the front 34 of the passenger cabin 30, as shown in FIG. 2.

With reference to FIG. 5A, the first portion 22 of the panel 18 and the second portion 26 of the panel 18 may be rolled in opposite directions relative to the intermediate portion 66 of the panel 18 in the uninflated position. The first portion 22 of the panel 18 is rolled, i.e., turned over on itself, in a clockwise direction CW towards the intermediate portion 66 of the panel 18. The second portion 26 of the panel 18 is rolled, i.e., turned over on itself, in a counterclockwise direction CCW towards the intermediate portion 66 of the panel 18.

The panel 18 includes a first side edge 68 and a second side edge 70 spaced from each other and extending along the first portion 22 of the panel 18 and along the second portion 26 of the panel 18, as shown in FIG. 5B. Each side edge 68, 70 may extend, for example, along the intermediate portion 66 of the panel 18. In other words, each side edge 68, 70 may extend along the panel 18 from the distal end 24 of the first portion 22 of the panel 18 to the distal end 28 of the second portion 26 of the panel 18. The first side edge 68 may be adjacent the first side 54 of the roof 48, and the second side edge 70 may be adjacent the second side 56 of the roof 48, as shown in FIG. 3, i.e., the panel 18 extends in a cross-vehicle direction from the first side edge 68 to the second side edge 70.

With reference to FIG. 5B, each sheet 20 extends along the first portion 22 of the panel 18 and the second portion 26 of the panel 18. Each sheet 20 extends transverse to the first portion 22 of the panel 18 and the second portion 26 of the panel 18, e.g., are perpendicular to the first portion 22 of the panel 18 and the second portion 26 of the panel 18. The plurality of sheets 20 may be spaced from each other between the first side edge 68 of the panel 18 and the second side edge 70 of the panel 18. The sheets 20 may be of identical construction as each other, and common numerals are used herein to refer to common features on the plurality of sheets 20. Each sheet 20 may include a top side 72 and a front side 74 converging with the top side 72 at the intermediate portion 66 of the panel 18. The top side 72 of the sheets 20 may extend from the intermediate portion 66 of the panel 18 to an end 76 spaced from the second portion 26 of the panel 18 along the first portion 22 of the panel 18. The end 76 of the top side 72 may be adjacent the distal end 24 of the first portion 22 of the panel 18. Specifically, the end 76 of the top side 72 may abut the distal end 24 of the first portion 22, or the end 76 of the top side 72 may be spaced from the distal end 24 of the first portion 22 with nothing between the end 76 of the top side 72 and the distal end 24 of the first portion 22.

The front side 74 of the sheets 20 may extend from the intermediate portion 66 of the panel 18 to an end 78 spaced from the first portion 22 of the panel 18 along the second portion 26 of the panel 18. The end 78 of the front side 74 may be adjacent the distal end 28 of the second portion 26 of the panel 18. Specifically, the end 78 of the front side 74 may abut the distal end 28 of the second portion 26, or the end 78 of the front side 74 may be spaced from the distal end 28 of the second portion 26 with nothing between the end 78 of the front side 74 and the distal end 28 of the second portion 26. With continued reference to FIG. 5B, the sheets 20 may be generally triangular. In this situation, the top side 74 and the front side 74 may be the legs of the triangle. In other words, the sheets 20 may include a sloped side (not numbered) extending from the end 76 of the top side to the end 78 of the front side 74 obliquely inclined from the panel 18, i.e., the hypotenuse.

With continued reference to FIG. 5B, each sheet 20 is flat in a plane P extending in the first direction D1 and the second direction D2. Each sheet 20 may be, for example, thin in the direction D3 from the first side 54 of the roof 48 to the second side 56 of the roof 48, i.e., transverse to the plane P. In other words, each sheet 20 extends a greater amount in each of the first direction D1 and the second direction D2 than in the direction D3 from the first side 54 of the roof 48 to the second side 56 of the roof 48.

With continued reference to FIG. 5B, the plurality of sheets 20 may include a first sheet 80 adjacent the first side edge 68 of the panel 18, a second sheet 82 adjacent the second side edge 70 of the panel 18, and intermediate sheets 84 disposed between the first sheet 80 and the second sheet 82. When the airbag 16 is in the inflated position, the intermediate sheets 84 may be disposed along the panel 18 such that one occupant may be disposed between adjacent sheets 20, e.g., the first sheet 80 and one intermediate sheet, one intermediate sheet and another intermediate sheet, another intermediate sheet and the second sheet 82, etc.

The plurality of sheets 20 may be attached to each of the first portion 22 of the panel 18 and the second portion 26 of the panel 18. The top side of the sheet may be, for example, attached to the first portion 22 of the panel 18, and the front side 74 of the sheet may be, for example, attached to the second portion 26 of the panel 18. The top side and front side 74 of the sheets 20 may be attached in a same or different manner to the first portion 22 of the panel 18 and the second portion 26 of the panel 18, respectively. For example, the sheets 20 may be attached to each of the first portion 22 of the panel 18 and the second portion 26 of the panel 18 by stitching. Alternatively, the sheets 20 may be attached to each of the first portion 22 of the panel 18 and the second portion 26 of the panel 18 by ultrasonic welding or any other suitable manner.

The airbag 16 includes an external tether 86 disposed adjacent to each side edge 68, 70 of the panel 18. In other words, one external tether 86 is adjacent the first side edge 68 of the panel 18, and another external tether 86 is adjacent the second side edge 70 of the panel 18. The external tethers 86 may be of identical construction, and common numerals are used herein to refer to common features on the external tethers 86. The external tethers 86 may extend from the roof 48 to the distal end 24 of the first portion 22, as shown in FIGS. 1-4. The external tethers 86 may include a first end 88 attached to the roof 48, e.g., one roof cross-beam 52, and a second end 90 spaced from the first end 88. The second end 90 is attached to the distal end 24 of the first portion 22.

The first end 88 and the second end 90 of external tethers 86 may be attached to the roof 48, e.g., one roof cross-beam 52, and the distal end 24 of the first portion 22, respectively, in a same or different manner. The first end 88 and the second end 90 of the external tethers 86 may be attached to the roof 48, e.g., one roof cross-beam 52, and the distal end 24 of the first portion 22, respectively, in any suitable manner. For example, the first end 88 of the external tethers 86 may be attached to the roof 48, e.g., one roof cross-beam 52, by the same manner as the base member 14, as set forth above. As another example, the second end 90 of the external tethers 86 may be attached to the distal end 24 of the first portion 22 by the same manner as the plurality of sheets 20 are attached to the panel 18, as set forth above.

The external tethers 86 may be formed of a different material than the airbag 16. The external tethers 86 may be stretchable relative to the airbag 16. For example, the external tether 86 may be able to stretch from a first position, in the uninflated position, to a second position in the inflated position. In the second position, the second end 90 may be spaced further from the first end 88 than in the first position, as shown in FIGS. 2 and 4. Alternatively, the first end 88 of the external tether 86 may be slideably engaged with a guide (not shown) on the roof 48. The guide may extend along the roof 48 in the first direction D1 from the base member 14 towards the distal end 24 of the first portion 22. The guide may include a front stop (not shown) adjacent the base member 14, and a rear stop (not shown) spaced from the base member 14 in the first direction D1. In the first position, the first end 88 of the external tethers 86 may abut the front stop of the guide. During inflation, the first portion 22 may pull the tether along the guide in the first direction D1. In the second position, the first end 88 of the external tether 86 may abut the rear stop of the guide.

The airbag 16 may include one or more internal tethers (not shown) disposed in the inflation chamber. The internal tethers may extend across the inflation chamber from the base member 14 to the panel 18, e.g., the first portion 22 and/or the second portion 26. Alternatively, the internal tethers may extend across the inflation chamber in the first portion 22 and/or in the second portion 26. The internal tethers may be attached to the panel 18 in a same or different manner as the plurality of sheets 20, as set forth above. The internal tethers may be attached to the base member 14 in a same or different manner as the airbag 16, as set forth above.

The airbag assembly 10 may include an inflator 92 in fluid communication with the airbag 16 that inflates the airbag 16 from the uninflated position to the inflated position. The inflator 92 expands the airbag 16 with an inflation medium, such as a gas, to move the airbag 16 from the uninflated position to the inflated position. Specifically, the inflator 92 may be in communication with the inflation chamber to supply the inflation medium to the inflation chamber. The inflator 92 may be supported by the roof cross-beam 52, as shown in FIG. 1, or may be disposed in any other suitable location. Alternatively, the inflator 92 may be supported by the base member 14.

The inflator 92 may be, for example, a pyrotechnic inflator that uses a chemical reaction to drive the inflation medium into the airbag 16. Alternatively, the inflator 92 may be, for example, a cold-gas inflator that, when activated, ignites a pyrotechnic charge that creates an opening for releasing the pressurized inflation medium to the airbag 16 via a fill tube 94. Alternatively, the inflator 92 may be of any suitable type, for example, a hybrid inflator.

Figure 6:
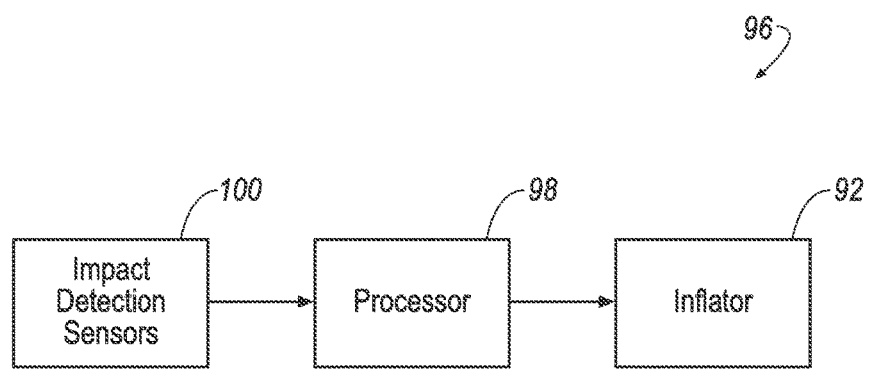
FIG. 6 is a flowchart of an inflation system of the vehicle.

With reference to FIG. 6, the vehicle 12 may include an inflation system 96. The inflation system 96 includes a processor 98 programmed to initiate an inflation of the airbag 16 in response to the vehicle impact. The processor 98 may be embedded in a microcontroller. The microcontroller may include memory, etc. The memory of the microcontroller may store instructions executable by the processor 98 and the processor 98 may read the instructions from the memory and execute the instructions.

The vehicle 12 may include impact detection sensors 100 programmed to detect the vehicle impact to the vehicle 12. The impact detection sensors 100 may be disposed in the roof 48 or elsewhere in the vehicle 12. The impact detection sensors 100 may be of various types, e.g., pressure sensor, acceleration sensor, vision sensor, etc. When the vehicle impact occurs, the processor 98 may receive one or more signals from the impact detection sensors 100 indicating the vehicle impact. In response to receiving the signals from the impact detection sensors 100, the processor 98 may initiate the inflation of the airbag 16. Alternatively, the processor 98 may initiate the inflation of the airbag 16 selectively based on information from the impact detection sensors 100 identifying the physical characteristics of the vehicle impact, e.g., which side of the vehicle 12 impacted, amount of pressure applied to the vehicle 12, etc. and also seat occupancy information, e.g., by using the occupancy sensors disposed inside the seats sensing the occupancy status of the seats.

In order to receive the signals from the impact detection sensors 100 and to initiate the inflation of the airbag 16, the processor 98 communicates with the impact detection sensors 100 and the inflator 92, e.g., through a direct electrical wiring, through which an analog or a digital signal is transmitted, or through a communication network like CAN (Control Area Network), Ethernet, LIN (Local Interconnect Network) or any other way.

In operation, the airbag 16 is in the uninflated position, as shown in FIGS. 1 and 2, under normal operating conditions of the vehicle 12. When the impact detection sensors 100 sense an impact of the vehicle 12, the processor 98 triggers the inflator 92 to inflate the airbag 16 with the inflation medium from the uninflated position to the inflated position. When the inflator 92 inflates the airbag 16 to the inflated position, the inflation medium flows to the inflation chamber increasing the pressure in the inflation chamber. As the pressure is increased in the inflation chamber, the airbag 16 breaks through the tear seam 102 of the headliner 58, and the first portion 22 of the panel 18 and the second portion 26 of the panel 18 extend away from the base member 14 in the first direction D1 and the second direction D2, respectively. During inflation, the tension of the external tethers 86 increases to assist in urging the distal end 24 of the first portion 22 towards the roof 48. The second portion 26, during inflation, contacts the deflector urging the second portion 26 of the panel 18 in the second direction D2. In the inflated position, the second portion 26 may abut the seat-back 40 of the front seat 32, which provides a counteracting force to the impact of the occupant. As the occupant moves within the vehicle 12 due to the momentum of the vehicle impact, the occupant may move towards the panel 18, e.g., the second portion 26 of the panel 18. When the occupant impacts the panel 18, the head of the occupant may slide or rotate towards one of the side edges of the panel 18 or another occupant. In this situation, the head of the occupant may impact one of the sheets 20. One of the sheets 20 may catch the head of the occupant to reduce sliding and/or rotating motion. When the knees of the occupant impact the second portion 26 of the panel 18, the second portion 26 of the panel 18 may absorb the energy from the knees of the occupant, which may assist in reducing knee impact injuries.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
 a roof including a first side and a second side spaced from each other;
 a base member supported by the roof;
 an airbag supported by the base member and being inflatable to an inflated position;
 the airbag including a panel in the inflated position having a first portion extending along the roof from the base member to a distal end adjacent to the roof and a second portion extending transverse to the roof from the base member to a distal end spaced from the roof;
 the panel including a first side edge and a second side edge spaced from each other and each extending along the first portion and the second portion, the first side edge being adjacent the first side of the roof, and the second side edge being adjacent the second side of the roof; and
 an external tether disposed adjacent to each side edge of the panel, the external tethers extending from the distal end of the first portion to the roof.

2. The system according to claim 1, wherein the panel includes an intermediate portion extending from the first portion to the second portion, the intermediate portion being attached to the base member.

3. The system according to claim 2, wherein the first side edge and the second side edge each extend along the intermediate portion.

4. The system according to claim 2, wherein the first portion and the second portion are rolled in opposite directions relative to the intermediate portion in an uninflated position.

5. The system according to claim 2, wherein the first portion and the second portion extend from the intermediate portion in opposite directions in an uninflated position.

6. The system according to claim 1, wherein the airbag includes a plurality of sheets attached to the panel, each sheet extending along the panel from the first portion to the second portion and transverse to the first portion and the second portion.

7. The system according to claim 6, wherein a first sheet of the plurality of sheets is adjacent the first side edge, a second sheet of the plurality of sheets is adjacent the second side edge, and intermediate sheets of the plurality of sheets are disposed between the first sheet and the second sheet.

8. The system according to claim 6, wherein, in the inflated position, the first portion extends in a first direction from the base member to the distal end of the first portion, and the second portion extends in a second direction transverse to the first direction from the base member to the distal end of the second portion, and wherein each sheet is flat in a plane extending in the first direction and the second direction.

9. The system according to claim 1, wherein the external tether is stretchable relative to the airbag.

10. The system according to claim 1, further comprising a deflector attached to the roof adjacent to the second portion, and in the inflated position, the first portion extends in a first direction from the base member to the distal end of the first portion, and the second portion extends in a second direction transverse to the first direction from the base member to the distal end of the second portion, the deflector extending from the roof in the second direction.

11. The system according to claim 1, further comprising a front seat and a rear seat spaced from the front seat, the second portion of the panel disposed between the front seat and the rear seat in an uninflated position.

12. The system according to claim 11, wherein the front seat includes a seat bottom and a seatback extending upwardly from the seat bottom, and wherein the second portion abuts the seatback in the inflated position.

13. An airbag assembly comprising:
 a base member;
 an airbag supported by the base member and being inflatable to an inflated position;
 the airbag including a panel in the inflated position having a first portion extending in a first direction from the base member to a distal end and a second portion extending from the base member to a distal end in a second direction transverse to the first direction; and
 a plurality of sheets attached to the panel, each sheet elongated in the first direction along the first portion of the panel and elongated in the second direction along the second portion of the panel.

14. The airbag assembly according to claim 13, wherein the panel includes an intermediate portion extending from the first portion to the second portion, the intermediate portion being attached to the base member.

15. The airbag assembly according to claim 14, wherein the first portion and the second portion are rolled in opposite directions relative to the intermediate portion in an uninflated position.

16. The airbag assembly according to claim 13, wherein the panel includes a first side edge and a second side edge spaced from each other and each extending along the first portion and the second portion.

17. The airbag assembly according to claim 16, wherein a first sheet of the plurality of sheets is adjacent the first side edge, a second sheet of the plurality of sheets is adjacent the second side edge, and intermediate sheets of the plurality of sheets disposed between the first sheet and the second sheet.

18. The airbag assembly according to claim 16, wherein, in the inflated position, each sheet is flat in a plane extending in the first direction and the second direction.

19. The airbag assembly according to claim 13, wherein the distal end of the first portion and the distal end of the second portion are spaced from each other in the inflated position.

20. A system comprising:
 a roof including a first side and a second side spaced from each other;
 a base member supported by the roof;
 an airbag supported by the base member and being inflatable to an inflated position;
 the airbag including a panel in the inflated position having a first portion extending along the roof from the base member to a distal end adjacent to the roof and a second portion extending transverse to the roof from the base member to a distal end spaced from the roof;

the panel including a first side edge and a second side edge spaced from each other and each extending along the first portion and the second portion, the first side edge being adjacent the first side of the roof, and the second side edge being adjacent the second side of the roof; and a deflector attached to the roof adjacent to the second portion, and in the inflated position, the first portion extends in a first direction from the base member to the distal end of the first portion, and the second portion extends in a second direction transverse to the first direction from the base member to the distal end of the second portion, the deflector extending from the roof in the second direction.

* * * * *